Oct. 2, 1951            C. S. BRUSH            2,569,553
LUBRICATOR FOR AIR LINES
Filed Oct. 23, 1948
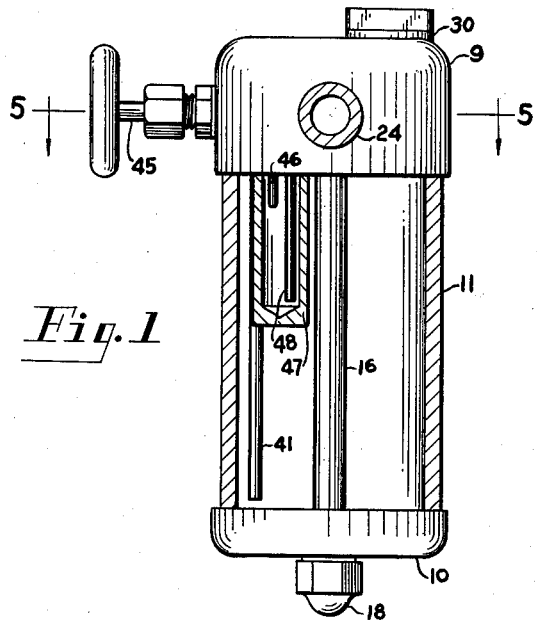
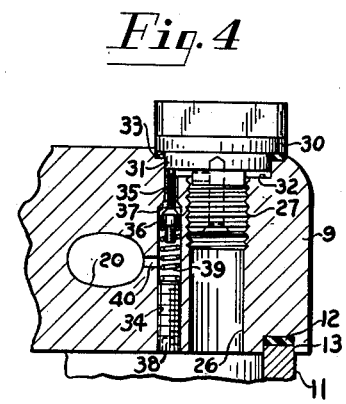
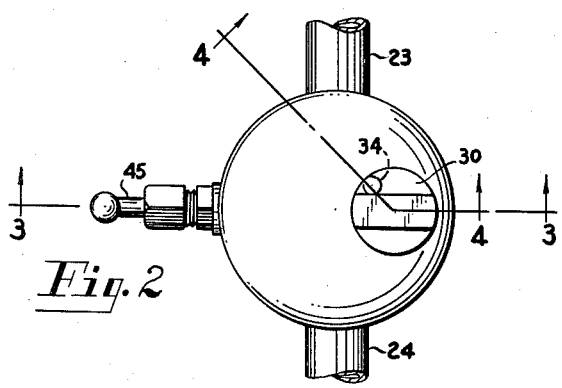
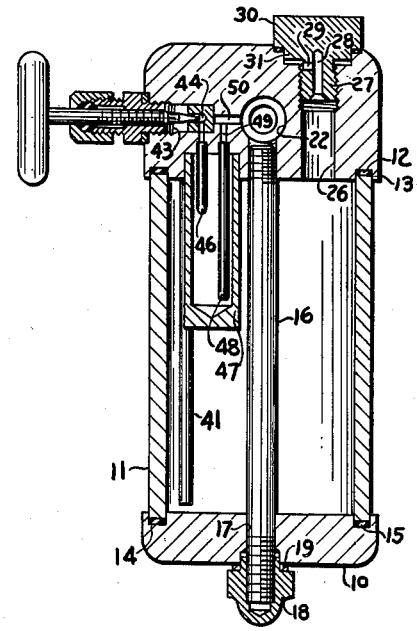
INVENTOR.
CORNING STEVENS BRUSH.
BY
ATTORNEY.

Patented Oct. 2, 1951

2,569,553

UNITED STATES PATENT OFFICE 2,569,553

LUBRICATOR FOR AIR LINES

Corning Stevens Brush, Algonac, Mich., assignor to Monnier Brothers, Inc., Algonac, Mich., a corporation of Michigan Application October 23, 1948, Serial No. 56,159

6 Claims. (Cl. 184—55)

My invention relates to a new and useful improvement in a lubricator for a fluid line and particularly adapted for use on air lines connected to an air operated tool. It is customary to interpose in an air line a lubricator so arranged and constructed that as the air passes through the line it will receive from the lubricator a quantity of lubricant and carry it to the tool which is being operated by the air so as to properly lubricate the parts of the tool which come into contact with the air. In the use of such tools it is desirable that the quantity of lubricant which is being drawn into the air lines shall be visible at all times. It is also desirable that when the air is shut off the lubricant which has been brought into the container for delivery into the air lines will not return to the lubricant container but shall be held in position ready for use when the air is again turned on. Experience has shown that it is undesirable to have a check valve or other valve mechanisms in this line through which the lubricant travels from the container to the outlet and it is an object of the present invention to provide a construction whereby the lubricant delivered to the air lines may be visible at all times and whereby the return of the lubricant to the lubricant container upon shutting off of the air will be prevented without the interposition of any valve.

Another object of the invention is the provision in a lubricator of this class of a container for containing the lubricant and having within it a sealed container into which lubricant is delivered prior to the delivery of the same to the air lines.

Another object of the invention is the provision in a lubricator of this class of a lubricant container and a delivery mechanism for delivering the lubricant to the air lines which mechanism is contained within the container itself.

Another object of the invention is the provision of a lubricator of this class which will be simple in structure, economical to manufacture, durable, compact, and highly efficient in use.

Other objects will appear hereinafter.

It is recognized that various modifications and changes may be made in the detail of structure illustrated without departing from the invention and it is intended that such shall be contemplated herein.

Forming a part of this application are drawings in which

Fig. 1 is a side elevational view of the invention with parts broken away and shown in sections, Fig. 2 is a top plan view of the invention, Fig. 3 is a sectional view taken on line 3—3 of Fig. 2, Fig. 4 is a fragmentary enlarged sectional view taken on line 4—4 of Fig. 2, Fig. 5 is a sectional view taken on line 5—5 of Fig. 1.

In the drawings I have illustrated the invention as comprising a bowl 11 formed from transparent material and in which the lubricant is housed. Associated with this bowl 11 a head 9 and a bottom 10 which is preferably formed from metal or any other suitable material. Formed in the bottom of the head 9 is an annular groove 12 in which is positioned a ring of sealing material 13 which engages the end edge of the bowl 11. An annular groove 14 is formed on the inner face of the bottom 10 and in this annular groove 14 is positioned a ring 15 of sealing material which engages the bottom edge of the bowl 11. Threaded into the head 9 and projecting through an opening 17 formed in the bottom 10 is a rod 16 on which is threaded a nut 18 bearing against the sealing gasket 19 so as to securely hold the parts in assembled relation.

Formed through the head is a passage 20 having the constricted portions 21 and 22. Leading into this passage 20 at one end is the inlet delivery pipe 23 and outwardly from the other end is the outlet delivery pipe 24 through which the air is directed under pressure.

Formed through the head 9 is a filling opening 26 in which is threaded the screw or plug 27 having the longitudinally directed central passage 28 formed therein communicating with the lateral passage 29 positioned below the extension 31 on the head 30. This extension 31 seats in a recess 32 formed in the head 9 so that the head 30 may bear against the sealing gasket 33 as clearly shown in Fig. 4.

Formed adjacent to the opening 26 is the chamber or passage 34 which extends parallel thereto and in which is positioned a valve stem 35 carrying the valve 36 adapted to bear against the seat 37 formed at the upper end of the passage 34. Positioned within the passage 34 is a coil spring 39 bearing at one end against the plug 38 which is threaded into one end of the passage 34, the opposite end of the spring 39 bearing against the valve head 36 and tending normally to forcing against the seat 37 so as to close the passage. This passage 34 is in communication with the air delivery passage 20 by means of the lateral passage 40. This structure embodying the mechanism associated with the filling opening 26 is intended to be covered by a separate application filed under even date herewith. When the plug is removed from the opening 26 the bowl may be filled with lubricant through the opening or passage 26. Upon removal of the plug 30 the valve stem 35 will move upwardly permitting the valve head 36 to engage in the seat and thus close communication between the passage 40 and the recess or chamber 32, this recess or chamber 32 being in communication, through the passage 29, with the passage 28. The construction is such that when the closure 30 is in closing position as shown in Fig. 4 the valve head will be moved to open position because of engagement of the pin 35 with the extension 31. When the structure is in the form shown in Fig. 4 the air passes through the head 9 and it will also pass through the passage 40 into the passage 34 and thence upwardly into the recess or chamber 32 and thence through the passage 29 and the passage 28 downwardly so as to set up the pressure in the bowl. This will have a tendency, of course, to force the liquid upwardly from the bowl through the tube 41 into the passage 42 shown in Fig. 5 then into the tube 46. The amount of liquid which may travel upwardly through the tube 41 into the tube 46 may be regulated by the needle valve 45. Since the member 47 is transparent and the bowl 11 is also transparent the lubricant dropping into the container 47 from the tube 46 is visible from the exterior. This container 47 is air tight, so that the lubricant passing through tube 41 and 46 into the container 47 will, when it has risen within the container 47 above the lower end of the tube 48, serve to compress whatever air may be in the container 47 and maintain this air under pressure. When a condition of equilibrium or balance of air pressure between tube 41 and the interior of container 47 is obtained, no flow of lubricant will pass into the container 47 from the tube 46 unless lubricant is passing outwardly through the tube 48 so that when the operator, by observing the lubricator from the exterior, notices the lubricant dripping from the tube 46 he is made aware of the fact that lubricant is passing through the tube 48 and the passages 49 and 50 into the air lines and the quantity of lubricant so passing is indicated by the quantity which is dripping or flowing from the end of the tube 46.

While the lubricant is contained within the bowl 11 sufficiently to cover the lower end of the tube 41 it is obvious that there can be no back flow through the tubes 48, 46, or 41 when the air line is shut off and that the lubricant already elevated in position for use will remain in position for immediate use upon the turning on of the air lines. The needle valve is not used to check any back flow. It is merely used to regulate the amount of lubricant which may flow through the tube 41 to the tube 46. It is to be noted that the indicating mechanism is all contained within the bowl 11 and consequently on the head 9 there are no outward projections, thus forming a compact structure and making it possible to mount the lubricator within narrow places or spaces.

When it is desired to fill the bowl 11 it is not necessary to shut off any flow of air through the air lines as the removal of the plug 30 will be accompanied by the movement of the valve 36 onto its seat, thus shutting off the flow of air pressure into the bowl 11.

What I claim is:

1. A lubricator of the class described, comprising a vertically disposed bowl; a head on said bowl, said head having an air passage formed horizontally therethrough for conducting air under pressure therethrough; a container mounted on said head and positioned within said bowl; a tube mounted on said head and projecting at one end into said container and terminating at its lower end adjacent to the bottom of said container and communicating at its upper end with the air passage through said head; a shorter tube mounted on said head and projecting at one end into said container; a lubricant delivery tube mounted on said head and projecting at one end into said bowl and terminating at its lower end below the normal lubricant level in said bowl and communicating at its upper end through a passage in said head with said shorter tube for delivering lubricant into said container, said head having a passage formed therethrough communicating with the air passage and with the interior of said bowl for delivering air under pressure to said bowl.

2. A lubricator of the class described, comprising a vertically disposed bowl; a head on said bowl, said head having an air passage formed horizontally therethrough for conducting air under pressure therethrough; a container mounted on said head and positioned within said bowl; a tube mounted on said head and projecting at one end into said container and terminating at its lower end adjacent to the bottom of said container and communicating at its upper end with the air passage through said head; a shorter tube mounted on said head and projecting at one end into said container; a lubricant delivery tube mounted on said head and projecting at one end into said bowl and terminating at its lower end below the normal lubricant level in said bowl and communicating at its upper end through a passage in said head with said shorter tube for delivering lubricant into said container, said head having a passage formed therethrough communicating with the air passage and with the interior of said bowl for delivering air under pressure to said bowl; and a manually operable valve for controlling communication of said delivery tube with said shorter tube for controlling the amount of lubricant delivered from said bowl into said container.

3. A lubricator of the class described, comprising a vertically disposed bowl; a head on said bowl, said head having an air passage formed horizontally therethrough for conducting air under pressure therethrough; a container mounted on said head and positioned within said bowl; a tube mounted on said head and projecting at one end into said container and terminating at its lower end adjacent to the bottom of said container and communicating at its upper end with the air passage through said head; a shorter tube mounted on said head and projecting at one end into said container; a lubricant delivery tube mounted on said head and projecting at one end into said bowl and terminating at its lower end below the normal lubricant level in said bowl and communicating at its upper end through a passage in said head, with said shorter tube for delivering lubricant into said container, said bowl and said container being transparent.

4. A lubricator of the class described comprising a vertically disposed bowl for reception of lubricant; a head on said bowl; a bottom on said bowl, said head having an air passage formed horizontally therethrough for conducting air under pressure therethrough and provided with a constricted portion, said head having passage formed therethrough anterior of said constricted portion for conducting air under pressure from said air passages to the interior of said bowl; a container mounted on said head and positioned within said bowl; an outlet delivery tube mounted on said head and projecting at one end into said container and normally terminating at its lower end below the normal liquid level in said container and adapted for communicating through a passage in said head with said air passage at the opposite side of said constricted portion; a shorter tube mounted on said head and projecting into said container and terminating at its inner end above the inner end of said outlet delivery tube; an inlet delivery tube mounted on said head and projecting at one end into said bowl and terminating at its lower end at a point normally below the lubricant level in said bowl and communicating at its opposite end through a passage with said shorter tube for delivering lubricant from said bowl into said container.

5. A lubricator of the class described comprising a vertically disposed bowl for reception of lubricant; a head on said bowl; a bottom on said bowl, said head having an air passage formed horizontally therethrough for conducting air under pressure therethrough and provided with a constricted portion, said head having a passage formed therethrough anterior of said constricted portion for conducting air under pressure from said air passages to the interior of said bowl; a container mounted on said head and positioned within said bowl; an outlet delivery tube mounted on said head and projecting at one end into said container and normally terminating at its lower end below the normal liquid level in said container and adapted for communicating through a passage in said head with said air passage at the opposite sides of said constricted portion; a shorter tube mounted on said head and projecting into said container and terminating at its inner end above the inner end of said outlet delivery tube; an inlet delivery tube mounted on said head and projecting at one end into said bowl and terminating at its lower end at a point normally below the lubricant level in said bowl and communicating at its opposite end through a passage with said shorter tube for delivering lubricant from said bowl into said container; and a manually operative valve for controlling the communication between said second-named tube and said inlet delivery tube for controlling the amount of lubricant flowing from said bowl into said container.

6. A lubricator of the class described comprising a vertically disposed bowl for reception of lubricant; a head on said bowl; a bottom on said bowl, said head having an air passage formed horizontally therethrough for conducting air under pressure therethrough and provided with a constricted portion, said head having a passage formed therethrough anterior of said constricted portion for conducting air under pressure from said air passage to the interior of said bowl; a container mounted on said head and positioned within said bowl; an outlet delivery tube mounted on said head and projecting at one end into said container and normally terminating at its lower end below the normal liquid level in said container and adapted for communicating through a passage in said head with said air passages at the opposite side of said constricted portion; a shorter tube mounted on said head and projecting into said container and terminating at its inner end above the inner end of said outlet delivery tube; an inlet delivery tube mounted on said head and projecting at one end into said bowl and terminating at its lower end at a point normally below the lubricant level in said bowl and communicating at its opposite end through a passage with said shorter tube for delivering lubricant from said bowl into said container; and a manually operative valve for controlling the communication between said second-named tube and said inlet delivery tube for controlling the amount of lubricant flowing from said bowl into said container, said container and said bowl being transparent.

CORNING STEVENS BRUSH.

REFERENCES CITED

The following references are of record in the file of this patent:

UNITED STATES PATENTS

| Number | Name | Date |
|---|---|---|
| 1,961,444 | Lewis | June 5, 1934 |
| 2,223,700 | Norgren | Dec. 3, 1940 |
| 2,304,644 | Heftler | Dec. 8, 1942 |
| 2,306,942 | Fox | Dec. 29, 1942 |